(12) United States Patent
Kleine et al.

(10) Patent No.: US 7,012,462 B2
(45) Date of Patent: Mar. 14, 2006

(54) DEMODULATION CIRCUIT

(75) Inventors: Ulrich Kleine, Helmstedt (DE); Falk Roewer, Magdeburg (DE); Klaus Salzwedel, Magdeburg (DE); Felix Mednikov, Ortenburg (DE); Martin Sellen, Ortenburg (DE)

(73) Assignee: Micro-Epsilon Messtechnik GmbH & Co. KG, Ortenburg (DE)

( * ) Notice: Subject to any disclaimer, the term of this patent is extended or adjusted under 35 U.S.C. 154(b) by 156 days.

(21) Appl. No.: 10/648,957

(22) Filed: Aug. 27, 2003

(65) Prior Publication Data

US 2004/0071245 A1    Apr. 15, 2004

Related U.S. Application Data

(63) Continuation of application No. PCT/DE02/03508, filed on Mar. 27, 2003.

(30) Foreign Application Priority Data

Sep. 19, 2001    (DE) .............................. 101 46 286

(51) Int. Cl.
*H03K 9/00*    (2006.01)
(52) U.S. Cl. .................. 329/311; 375/350; 324/207.17
(58) Field of Classification Search ................ 324/658, 324/671, 207.17; 329/311; 375/350
See application file for complete search history.

(56) References Cited

U.S. PATENT DOCUMENTS

| | | | |
|---|---|---|---|
| 4,507,625 A | 3/1985 | Lee et al. | |
| 4,626,808 A | 12/1986 | Nossek | |
| 5,629,619 A | 5/1997 | Mednikov | |
| 5,729,163 A | 3/1998 | McCleary et al. | |
| 6,356,085 B1 * | 3/2002 | Ryat et al. .................. | 324/658 |

FOREIGN PATENT DOCUMENTS

| | | |
|---|---|---|
| EP | 0 119 627 A2 | 9/1984 |
| EP | 0 402 510 A1 | 12/1990 |
| EP | 0 611 165 A1 | 8/1994 |
| WO | WO 98/59216 A1 | 12/1998 |
| WO | WO 00/25093 | 5/2000 |

* cited by examiner

Primary Examiner—Arnold Kinkead
(74) Attorney, Agent, or Firm—Alston & Bird LLP

(57) ABSTRACT

A circuit and method for demodulating at least one modulated signal (e), such as a measuring signal of a sensor. The circuit comprises at least one input (1), with the signal (e) being applied to the input (1), and the input is connected to at least one switched-capacitor network which is configured to demodulate the signal. The circuit permits use even in a small available space.

22 Claims, 6 Drawing Sheets

DEMODULATION CIRCUIT

CROSS REFERENCE TO RELATED APPLICATION

This is a continuation of international application PCT/DE02/03508, filed Mar. 27, 2003, and which designates the U.S.

BACKGROUND OF THE INVENTION

The invention relates to a circuit for demodulating at least one modulated signal, preferably a measuring signal of a sensor, the circuit comprising at least one input, with the signal being applied to the input. The invention further relates to a method of demodulating a modulated signal, preferably a measuring signal of a sensor, in particular for operating a demodulation circuit having at least one input, with the signal being applied to the input.

Circuits for demodulating signals have been known in practical operation for a long time. The signal could be, for example, a measuring signal of a sensor system, which is used to measure distances in a noncontacting manner, as disclosed, for example, in DE 42 25 968 A1 and corresponding U.S. Pat. No. 5,629,619. In this case, the sensor system is an inductive displacement sensor, which is operated at relatively low frequencies in a range from 1 kHz to 10 kHz. The known sensor system comprises a sensor coil that is activated in phase opposition, with a ring overlying it in noncontacting relationship. This ring influences the inductance of the sensor coil corresponding to the position of a test object. In the center of the sensor coil, a plurality of taps are located, which are averaged and amplified with a difference selection amplifier. Since the sensor coil is operated with an ac voltage signal, an ac voltage signal arises at the output of the difference selection amplifier, and in addition a voltage, which corresponds to the actual position of the ring and the transient behavior of the real sensor coil circuit. This signal must now be first demodulated. To this end, the input signal is again multiplied by the carrier frequency. It is then filtered by means of a low-pass filter. In this instance, it is already known to modulate with a sine-wave signal or a square-wave signal, which has a favorable effect in the processing of signals.

The known modulation is problematic in particular in that the occurring time constants of the filtration are very great, and that the circuit used for this purpose is made relatively large because of its setup and, consequently, is unsuited for an application, which has available only a small space for the circuit.

It is therefore an object of the present invention to provide both a demodulation circuit and a demodulation method of the initially described type, which enable a use of the circuit even when the available space for the circuit is small.

SUMMARY OF THE INVENTION

The above and other objects and advantages of the invention are achieved by a circuit and method wherein the demodulation of the signal occurs by at least one switched-capacitor network that connects to the input.

In accordance with the invention, it has been recognized that by departing from the previous practice, one must realize a miniaturization of the circuit of the art, in order to enable a plurality of applications of the circuit. This is accomplished in that the circuit is configured such that it can be constructed as an integrated circuit, and that an integration in an ASIC is made possible with a comparable transfer function of the known circuit. This is accomplished with the use of a switched-capacitor network that exhibits a satisfactory matching behavior and permits integrating and thus miniaturizing the circuit in particularly simple manner. As a result, it becomes possible to apply the circuit even in a very small space, thus making it universally usable, and to keep down the price of the circuit.

With respect to a particularly simple configuration, the switched-capacitor network could comprise at least two inputs, and/or at least one switched-capacitor amplifier, and/or at least one switched-capacitor integrator. This would permit a particularly simple setup of the circuit, since these elements exhibit a very satisfactory matching behavior.

With respect to avoiding parasitic flows, the switched-capacitor integrator could be realized as a negative, undelayed switched-capacitor integrator, and/or could include an amplification of one.

To further avoid parasitic flows, a first switched-capacitor amplifier could be realized as a positive, delayed amplifier, and/or could multiply two input signals each by at least one factor.

Furthermore, a second switched-capacitor amplifier could be realized as a positive, delayed switched-capacitor amplifier, and/or could delay the applied input signal by a half cycle of the clock frequency, and/or could have an amplification of one. A third switched-capacitor amplifier could be realized as a positive, delayed switched-capacitor amplifier, and/or could delay the applied input signal unamplified by a half cycle of the clock frequency. A fourth switched-capacitor amplifier could likewise be realized as a positive, delayed switched-capacitor amplifier, and/or could delay the applied input signal unamplified by a half cycle of the clock frequency.

In addition or as an alternative, a fifth switched-capacitor amplifier could be realized as a positive switched-capacitor amplifier, and/or could delay the applied input signal unamplified by a half cycle of the clock frequency. The applied input signal is the signal that is applied to the input of the respective switched-capacitor amplifier.

With respect to a particularly simple setup of the circuit, the output of the first switched-capacitor amplifier could be applied to an input of the switched-capacitor integrator. In addition or as an alternative, the output of the switched-capacitor integrator could be applied to a second input of the first switched-capacitor amplifier.

Furthermore, the output of the second switched-capacitor amplifier could be applied to an input of the third switched-capacitor amplifier. The output of the third switched-capacitor amplifier could now be applied to an input of the fourth switched-capacitor amplifier. In addition or as an alternative the output of the fourth switched amplifier could be applied to an input of the fifth switched-capacitor amplifier.

Furthermore, the output of the fifth switched-capacitor amplifier could be applied to a second input of the switched-capacitor integrator. In addition or as an alternative, the signal could be applied to a third input of the switched-capacitor integrator. The signal in this instance is the signal that is to be demodulated.

With respect to storing different values, the switched-capacitor could comprise at least two integrator capacitances. The integrator capacitances could be used, preferably alternately clocked, for storing a previous signal and/or for computing a reflected voltage wave. It would thus be possible to switch the integrator capacitance alternatingly with at least one clock signal. A clocking would enable the circuit to compute the transfer function for the positive clock phase, whereas the old value of the negative clock phase is stored in the integrator capacitance that is not interposed in the signal path. Conversely, this also applies to the negative clock phase. The clock signals used for switching the integrator capacitance have essentially or exactly twice the cycle length of the basic cycle, at which the circuit is operated. In this manner, one is able to use the hardware for computing the positive and the negative clock phase, without realizing different transfer functions. A purposeful layout of the integrator capacitances would permit achieving an especially satisfactory symmetry. The purposeful layout would make it possible to realize the integrator capacitances nearly identical with an error smaller than 0.1%.

In a further advantageous manner, the switched-capacitor network could comprise a filter arrangement. This filter arrangement could be used to filter the modulated signal for enabling an especially satisfactory digitization.

With respect to a particularly synchronous demodulation, the filter arrangement could include an n-path lag wave filter that is formed preferably by at least one switched-capacitor amplifier and/or the switched-capacitor integrator.

As regards a possibility of using the filter arrangement for different applications, for example, for different sensors, the coefficients of the filter arrangement could be digitally programmable, preferably by means of at least one switch. This would permit adapting the circuit to a plurality of sensors.

In a particularly advantageous manner, programming could occur by adding or disconnecting at least two capacitive components. In a further advantageous manner, the sum of the capacitive components could amount at most to two.

In a particularly advantageous manner, the switched-capacitor network could include a delay of a half cycle of the clock frequency.

In a further advantageous manner, the demodulated signal of the positive and negative values of the carrier frequency could be directly added with an additional switched-capacitor network. In addition or as an alternative, the demodulated signal could be adapted for being digitized by means of an A/D converter and/or for being supplied to a controller. This would permit obtaining a demodulated signal in a particularly simple manner.

The method of the present invention could be used in particular for operating a circuit according to the foregoing description. The method has the advantage that a circuit operated by it can be integrated in a very simple manner because of its excellent matching behavior.

As regards a particularly satisfactory demodulation and/or digitization, the signal could be filtered by means of a filter arrangement. With respect to the use of the switched-capacitor network for the demodulation, the signal could be converted to a square-wave signal.

In a further advantageous manner, it would be possible to sample the signal. In a particularly advantageous manner, it would be possible to sample the signal several times. The filtration could now occur by averaging.

The demodulated signal of the positive and negative values of the carrier frequency could be added by means of a further switched-capacitor network. In addition or as an alternative, the demodulated signal could be digitized by means of an A/D converter, and/or be supplied to a controller.

Within the scope of a particularly advantageous configuration, the circuit of the present invention could be a programmable switched-capacitor network, which permits demodulating a modulated measuring signal in a synchronous manner. Because of distortions, ripple factors, phase shifts, and phase rotations, as well as electromagnetic compatibility (EMC), it is necessary to filter the measuring signal. For this reason, it is desired to begin with filtering the measuring signal, to convert it to a square-wave signal, and subsequently sample it. As regards a very satisfactory integration, one could use a switched-capacitor filter. For a synchronous demodulation of the measuring signal, one uses an n-path lag wave switched-capacitor filter that can be integrated. To make the lag-wave switched-capacitor filter usable for different sensors, it is possible to adjust the filter coefficients in a digitally programmable way. After the filtration, the measuring signal may be sampled one or more times. In the case of a multisampling, a filtration may occur, for example, by way of averaging. The demodulated signals of the positive and negative values of the carrier frequency may both be directly added with an additional switched-capacitor network and be converted with an A/D converter and further processed by a controller. In both cases the thus-obtained value corresponds to the measured value of the sensor. A further advantage of the circuit according to the invention lies in that the sample-and-hold amplifier may be omitted.

There exist various possibilities of improving and further developing the teaching of the present invention in an advantageous manner. To this end, one may refer to the following description of preferred embodiments of the demodulation circuit and demodulation method according to the invention with reference to the drawings. In conjunction with the description of the preferred embodiments of the circuit and method of the invention with reference to the drawings, also generally preferred improvements and further developments of the teaching are described.

DETAILED DESCRIPTION OF THE PREFERRED EMBODIMENTS

Figure 1:
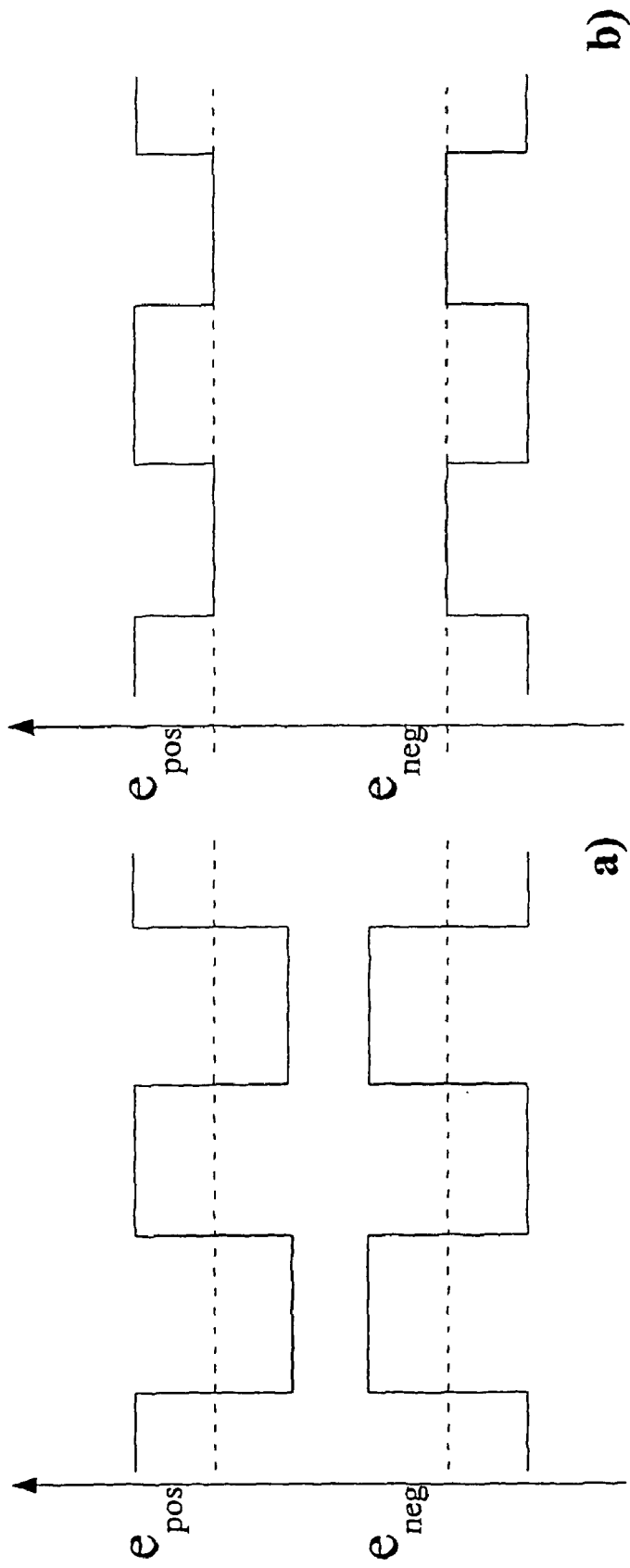
FIG. 1 is a schematic view of signals for operating a known circuit.

FIG. 1 shows signals for operating a known circuit for measuring distances. The known circuit is activated by an ac voltage and thus permits acquiring by way of measuring, a dc voltage component, which is proportional to the temperature. In the normal operation, i.e., during the measuring step, the ac voltage input signals $e_{pos}$ and $e_{neg}$ as shown in FIG. 1$a$ are used for activating the inputs of the known circuit. To determine the linearly dependent temperature behavior of the circuit and the measuring coil, however, the input signals $e_{pos}$ and $e_{neg}$ shown in FIG. 1$b$ are used. As best seen in FIG. 1$b$, the input signals $e_{pos}$ and $e_{neg}$ correspond to ac voltages, which are superposed with a dc voltage.

A known circuit for demodulating a modulated signal e, which corresponds to the measuring signal of the measuring coil, comprises an input 1, which receives the measuring signal e. In accordance with the invention, the demodulation of the measuring signal e occurs by means of a switched-capacitor network 2 that connects to input 1.

Figure 2:
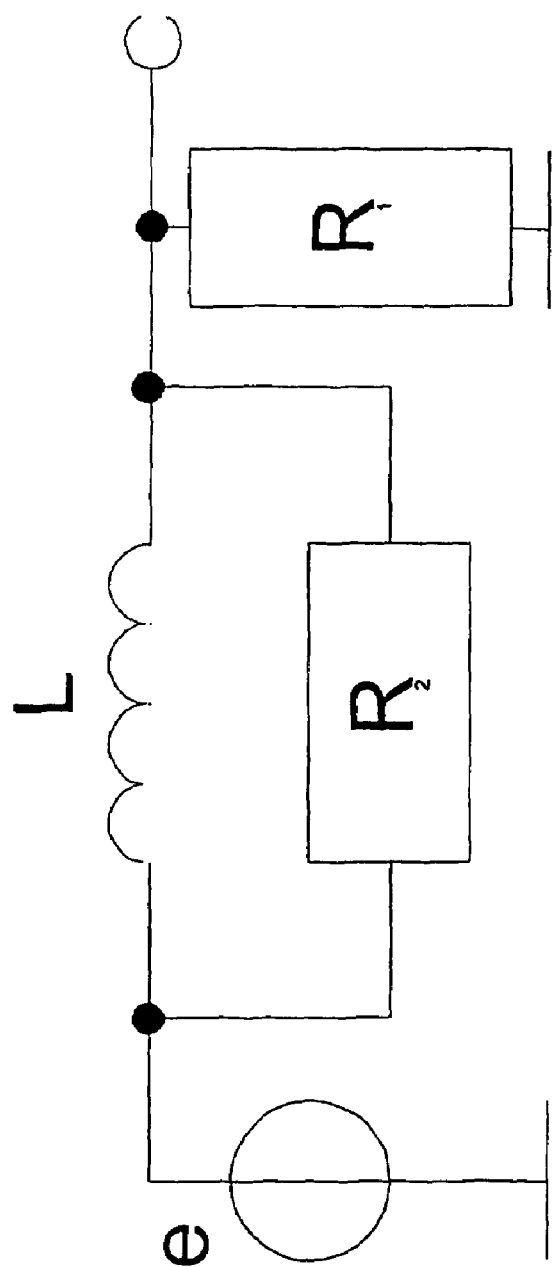
FIG. 2 is a schematic view of a passive reference network of a low-pass circuit.

FIG. 2 shows an equivalent passive reference network of a low-pass circuit. This reference network is likewise equivalent to a lag filter circuit. It comprises a voltage divider of resistances $R_1$ and $R_2$ and an inductance L connected parallel to the resistance $R_2$. The transfer function of this filter is that of a lag filter.

$$H(p) = \frac{R_1}{R_1 + \frac{R_2 pL}{R_2 + pL}} = \frac{R_1[R_2 + pL]}{R_1[R_2 + pL] + R_2 pL} \quad (1)$$

By transforming, one will obtain $$H(p) = \frac{1 + p\frac{L}{R_2}}{1 + p\left[1 + \frac{R_2}{R_1}\right]\frac{L}{R_2}} \quad (2)$$

with a zero at $p=-R_2/L$ and a pole at $p=-R_2/L*1/(1+R_2/R_1)$, and p being the general complex frequency variable.

Figure 3:
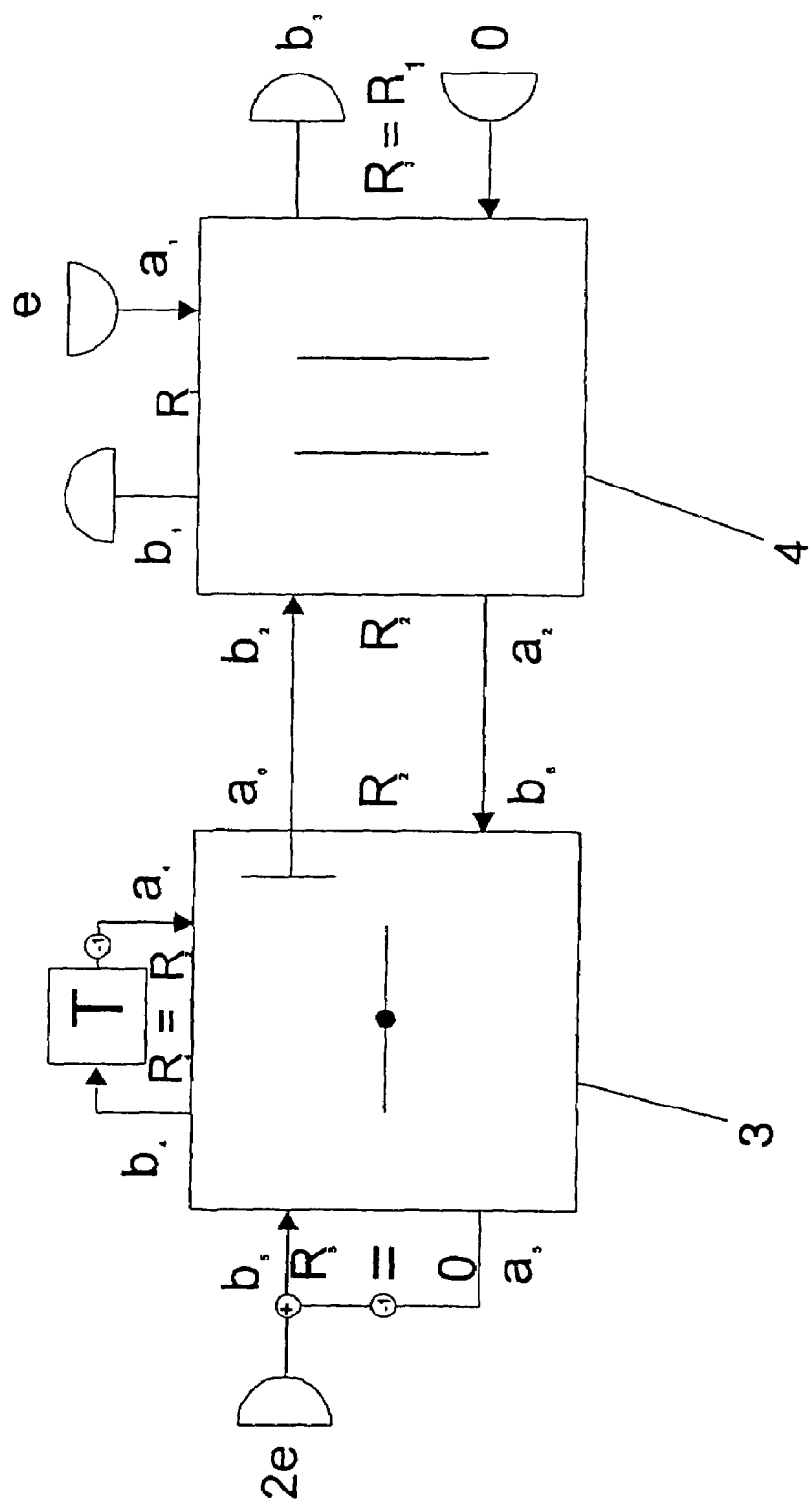
FIG. 3 is a schematic view of a wave flow diagram of the low-pass circuit of FIG. 2.

It is now possible to prepare a corresponding wave flow diagram, as is shown in FIG. 3. The wave flow diagram comprises a three-gate serial adapter 3 and a three-gate parallel adapter 4. The three-gate parallel adapter 4 is used to interconnect the terminating resistance $R_1$, the input resistance of the source of voltage, and a gate of three-gate serial adapter 3. The three-gate serial adapter 3 is used for interconnecting the inductance L, an ideal source of voltage with a zero internal resistance, and the link to the three-gate parallel adapter 4.

The three network elements of the low-pass circuit shown in FIG. 2 are realized as follows: The inductance L, which is series-connected to an ideal source of voltage, is represented by inputting the inductance at gate 4 and an ideal source of voltage at gate 5 of the three-gate serial adapter 3. Since in the case of the ideal source of voltage, the gate resistance is optional, it is selected zero in this special embodiment. According to FIG. 2, the series connection of the elements is parallel to the other elements. For this reason, the gate resistance $R_6$ equals $R_2$, thus constituting a nonreflecting connection. Since the resistance $R_5$ equals zero, it follows therefrom that the resistances $R_4$ and $R_2$ are equal. This equality results from the Kirchhoff's laws. Located on the upper side of the three-gate parallel adapter 4 is the wave flow diagram of a resistive source of voltage. Located on the right side of the three-gate parallel adapter 4 is the terminating resistance $R_1$ and the output of the filter.

Since wave filters are discrete in time, a new frequency variable $\psi$ is defined in the place of the complex frequency variable by $$\psi = \frac{z-1}{z+1} = \tanh\left(\frac{pT}{2}\right), \text{ with } z = e^{pT} \quad (3)$$

where T=1/F is the sampling period and F the sampling frequency. For purely imaginary frequencies, p becomes jω, and with that, $\psi$ becomes jφ

$$\phi = \tan\left(\frac{\omega T}{2}\right). \quad (4)$$

In this case, the adapter equations for the three-gate serial adapter 3 can be computed as follows:

$$b_6 = -a_1 - a_2 \quad (5)$$

and with $a_0 = a_6 - b_6$, $\quad (6)$ $$b_4 = -b_5 - a_6 \quad (7)$$

$$b_5 = a_5 - \gamma_5 a_0 = a_5, \quad (8)$$

where $\gamma_5 = 0$, and with the incident voltage waves $a_i$ and the emergent voltage waves $b_i$ for i=4, 5, 6. If one inserts equations 7 and 8 into equation (5) with the definition of the elements, one will obtain $$b_6 = -a_4 z^{-1} - e(1+z^{-1}) = b_2. \quad (9)$$

As can be noted from equation 9, this expression can also be represented as an external element, which consists of an inductance and a negative source of voltage, whose value represents the reflected voltage value, one time directly and one more time delayed.

The adapter equations for the three-gate parallel adapter 4 are:

$$b_3 = \gamma_1 e = \gamma_2 a_2 \quad (10)$$

$$b_2 = b_3 - a_2 \quad (11)$$

with the incident voltage waves $a_i$ and the emergent voltage waves $b_i$ for i=1, 2, 3. Accordingly, the output voltage results from $$U = \frac{a+b}{2} = \frac{b_3}{2} = \frac{1}{2}(\gamma_1 e + \gamma_2 a_2). \quad (12)$$

To avoid parasitic flows, it is desired that the switched-capacitor network amplify or integrate positively delayed or negatively undelayed. With this technique, different ways of realizing switched-capacitor wave filters are known.

Figure 4:
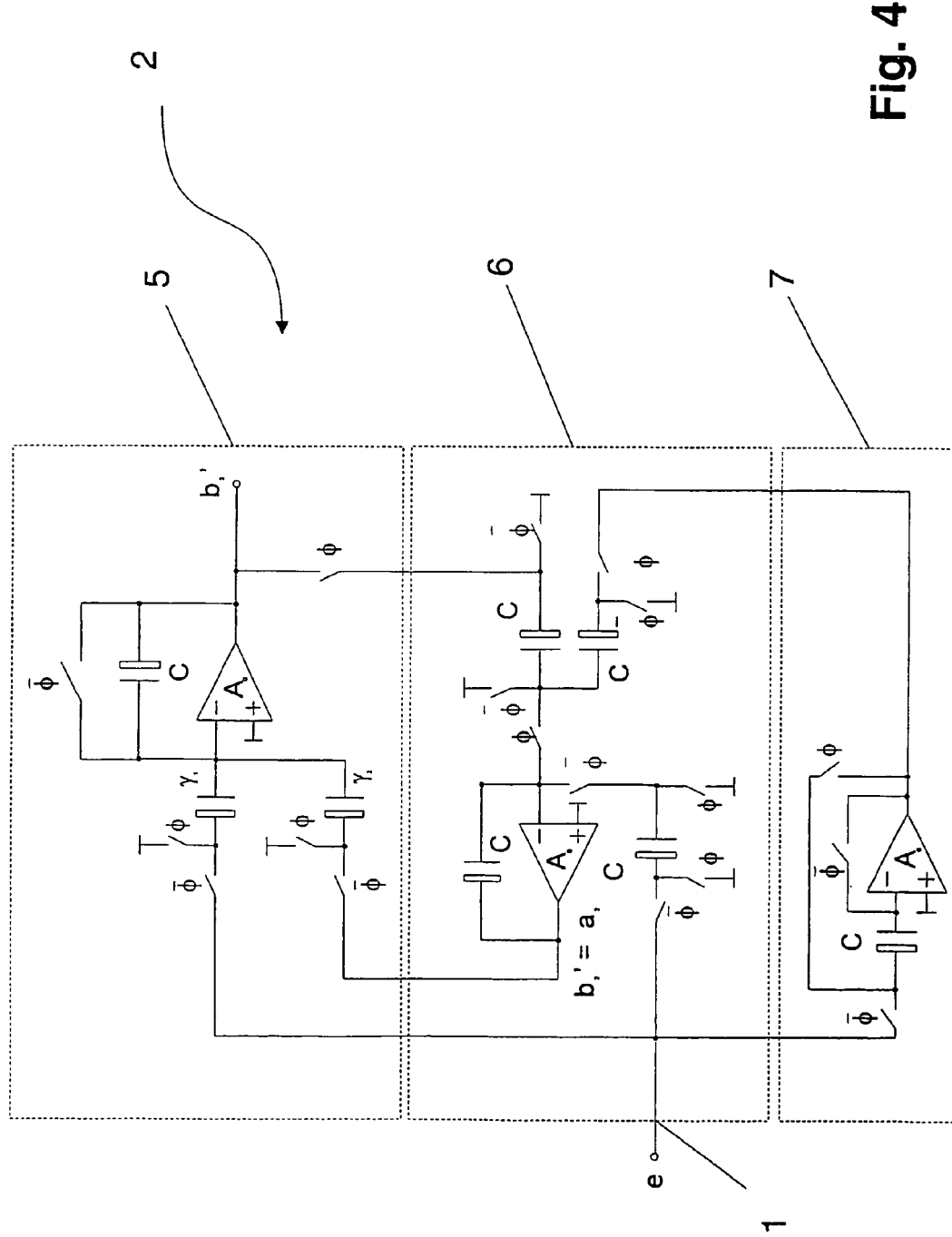
FIG. 4 is a schematic view of a switched-capacitor realization of a low-pass circuit.

FIG. 4 shows a switched-capacitor realization of the low-pass circuit or lag filter. The upper switched-capacitor amplifier 5 serves to reproduce equation 10. The signal e and its second input signal $a_2$ are positively delayed and multiplied by the factors $\gamma_1$, $\gamma_2$ in accordance with equation 10. In the phase $\bar{\phi}$ the signals are stored by means of corresponding switches on the input capacitances $\gamma_1$ and $\gamma_2$, and multiplication occurs with phase $\phi$. The output $b_3'$ of the switched-capacitor amplifier 5 represents the output of the lag filter.

Since in accordance with equation 10, the voltage results as an arithmetic mean value from the incident and the reflected voltage wave, the voltage at the output is amplified by the factor two, since the division by the factor two is not carried out—note equation 12. The two factors $\gamma_1$ and $\gamma_2$ of the equation are reproduced as capacitance ratios in the signal paths. Since these two capacitances are those, which solely determine the frequency behavior, they are each formed from an array of capacitances. Additional digital control lines may be used for interposing the individual capacitances in the signal path and for determining in this way the position of the pole and the zero.

An undelayed negative switched-capacitor integrator 6 forms the realization of equation 12 and equation 9. By coupling its output signal with switched-capacitor amplifier 5 in phase $\phi$, the feedback loop is closed. The combination of equation 12 and equation 9 results in $$b_2' = a_2 z^{-1} - \gamma_1 e z^{-1} - \gamma_2 a_2 z^{-1} - e(1-z^{-1}). \tag{13}$$

The output value $b_2'$ is composed of the stored integral value $a_2$, the negative delayed value of output value $b_3(\gamma_{1e} + \gamma_2 a_2)$, and the value $-e(1-z^{-1})$. The last term is realized by a negated, nondelaying addition in phase $\bar{\phi}$ with the input signal e and an undelayed addition in phase $\phi$. Since the undelayed input is to switch with the delayed signal e, it is necessary to present the signal e for selection also in a delayed fashion.

To this end, a switched-capacitor amplifier 7 is used. In phase $\bar{\phi}$ the input signal e is switched to one side of the switched-capacitor 7. Since in this phase the switched-capacitor amplifier 7 is inversely fed back by a switch, the virtual mass is located on the other side of the capacitance. In this phase, the input voltage is thus stored on the capacitance. In phase $\phi$, the capacitance is shorted with the output. In this phase, the switched-capacitor integrator 6 samples the output value. Accordingly, the entire circuit permits realizing a lag switched-capacitor filter.

It is now necessary to realize a clock-synchronous processing of the lag switched-capacitor filter, so that one can differentiate between a leading and a trailing edge.

Figure 5:
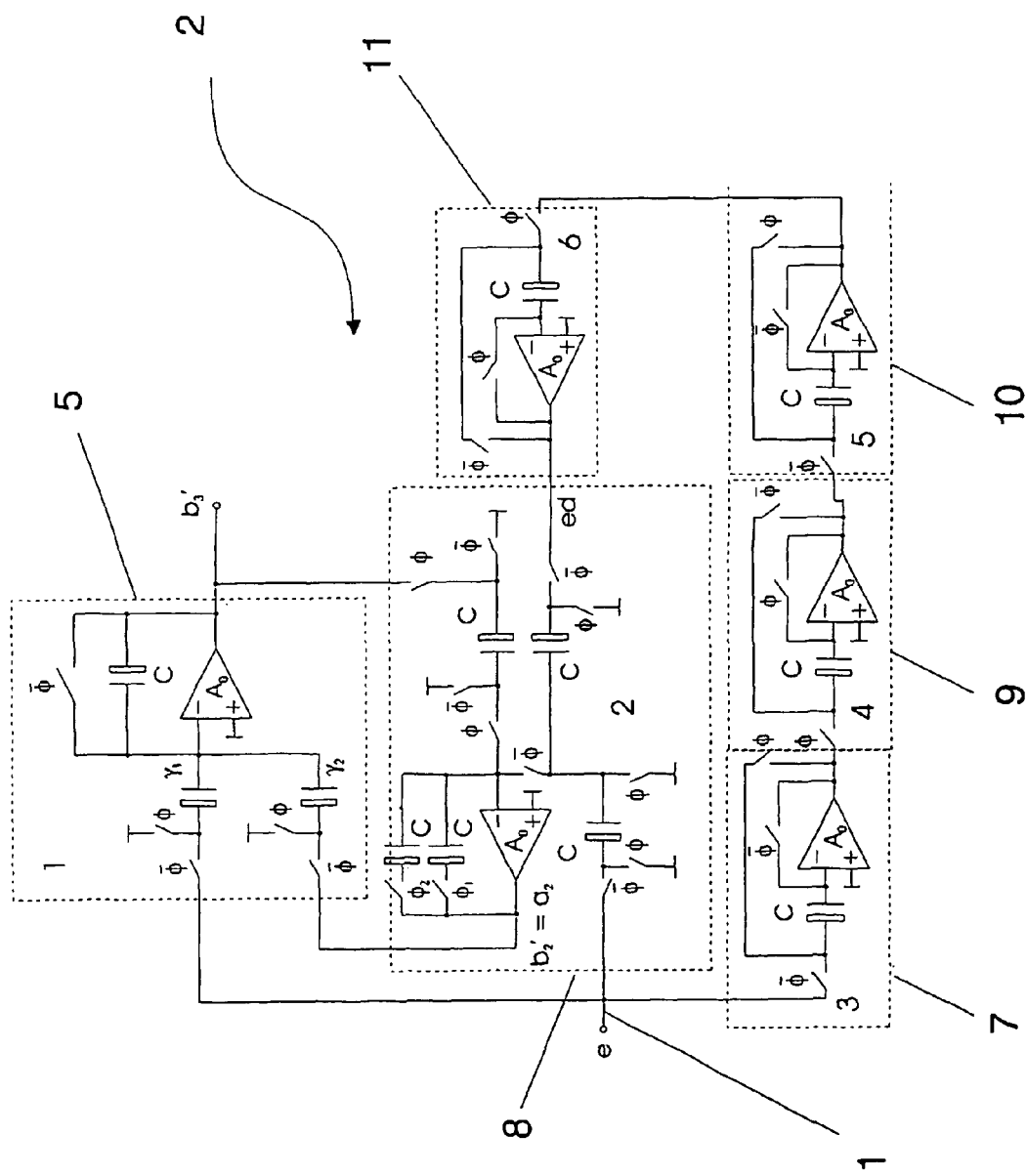
FIG. 5 is a schematic view of an embodiment of a circuit according to the invention.

A circuit in accordance with the invention for demodulating a signal is shown in FIG. 5. The upper switched-capacitor amplifier 5 corresponds to the switched-capacitor amplifier 5 of the circuit shown in FIG. 4. Likewise in this instance, the signal $b_3'$ is tapped at the output of this switched-capacitor amplifier 5. The circuit further comprises a switched-capacitor integrator 8. Unlike the switched-capacitor integrator 6 shown in FIG. 4, this switched-capacitor integrator includes two integrator capacitances, which are alternately switched with the clock signals $\phi_1$ and $\phi_2$.

To also store the delayed signal on the corresponding capacitance, the clocking of the delayed input is changed from $\phi$ to $\bar{\phi}$. The clocking permits using the circuit of the invention for computing the transfer function for the positive clock phase, while storing the previous value of the negative clock phase on the integrator capacitance that is not switched into the signal path. Conversely, this also applies to the negative clock phase.

The clock frequencies $\phi_1$ and $\phi_2$ have exactly twice the cycle length of the basic cycle $\phi$. In this manner, one can use the hardware for computing the positive and the negative clock phase, without incurring the risk of realizing different transfer functions.

The only reason for an asymmetry could be the two integrator capacitances, which are to be realized, however, nearly identical by a purposeful layout. In this instance, the error would be less than 0.1%. A further change of the circuit shown in FIG. 5 from that shown in FIG. 4 is that the delay line is made one cycle longer. This is accomplished by installing three additional delay elements, i.e., a third positively delayed switched-capacitor amplifier 9, as well as positively delayed fourth and fifth switched-capacitor amplifiers 10 and 11, which are clocked at one time with cycle $\phi$ and at another time with cycle $\bar{\phi}$.

Figure 6:
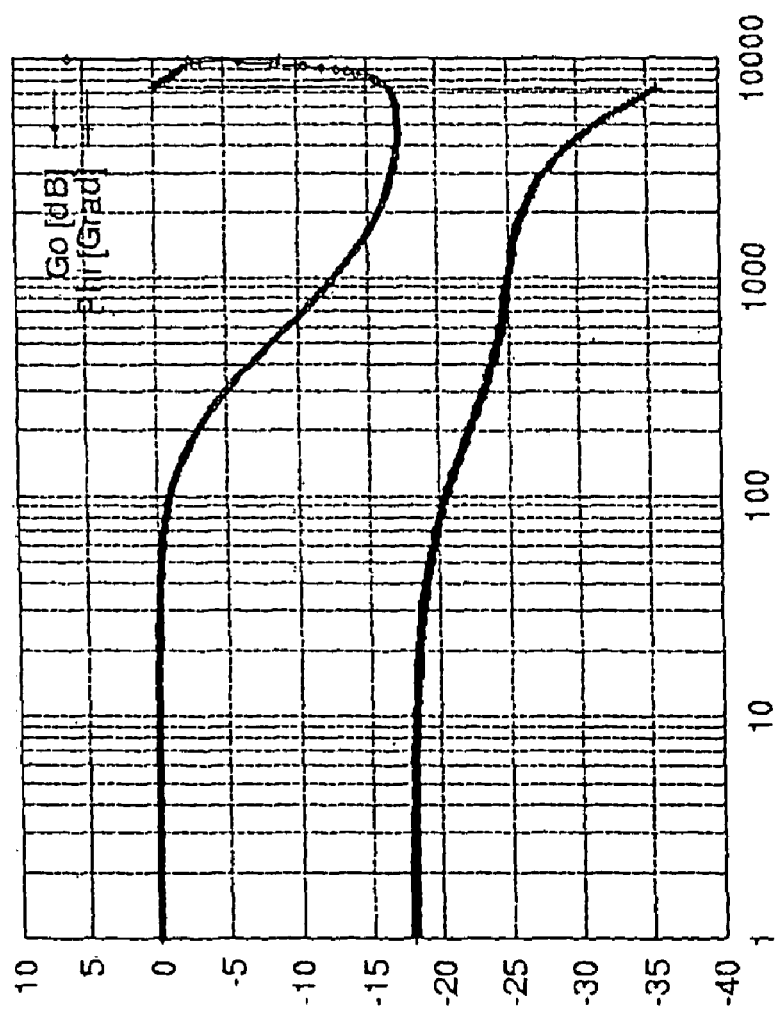
FIG. 6 illustrates a transfer function of the circuit shown in FIG. 5.

FIG. 6 illustrates a transfer function of the circuit of FIG. 5. It is quite obvious that the circuit shown in FIG. 5 permits realizing a very suitable n-path lag wave switched-capacitor filter.

As regards further details, the general description is herewith incorporated by reference for purposes of avoiding repetitions.

Finally, it should be explicitly remarked that the above described embodiments serve only to explain the claimed teaching, without however limiting it to these embodiments.

The invention claimed is:

1. A circuit for demodulating at least one modulated signal such as a measuring signal of a sensor, comprising
   at least one input to which the modulated signal may be applied, and
   at least one switched-capacitor network connected to the input for demodulating the signal, the switched-capacitor network including at least two inputs and at least one switched-capacitor amplifier and at least one switched-capacitor integrator, wherein the at least one switched-capacitor amplifier comprises a positive delayed switched-capacitor amplifier, which multiplies two input signals each by at least one factor.

2. The circuit of claim 1, wherein the network includes a second switched-capacitor amplifier which comprises a positive delayed switched-capacitor amplifier, which delays the applied input signal by a half cycle of a clock frequency, and has an amplification of one.

3. The circuit of claim 2, wherein the network includes a third switched-capacitor amplifier which comprises a positive delayed switched-capacitor amplifier, which delays the applied input signal unamplified by a half cycle of the clock frequency.

4. The circuit of claim 3, wherein the network includes a fourth switched-capacitor amplifier which comprises a positive delayed switched-capacitor amplifier, which delays the applied input signal unamplified by a half cycle of the clock frequency.

5. The circuit of claim 4, wherein the network includes a fifth switched-capacitor amplifier which comprises a positive delayed switched-capacitor amplifier, which delays the applied input signal unamplified by a half cycle of the clock frequency.

6. The circuit of claim 1, wherein the output of the one switched-capacitor amplifier is applied to an input of the one switched-capacitor integrator.

7. The circuit of claim 6, wherein the output of the one switched-capacitor integrator is applied to a second input of the one switched-capacitor amplifier.

8. The circuit of claim 3 wherein the output of the second switched-capacitor amplifier is applied to an input of the third switched-capacitor amplifier.

9. The circuit of claim 4, wherein the output of the third switched-capacitor amplifier is applied to an input of the fourth switched-capacitor amplifier.

10. The circuit of claim 5, wherein the output of the fourth switched-capacitor amplifier is applied to an input of the fifth switched-capacitor amplifier.

11. The circuit of claim 5, wherein the output of the fifth switched-capacitor amplifier is applied to an input of the switched-capacitor integrator.

12. The circuit of claim 11, wherein the at least one modulated signal is applied to another input of the switched-capacitor integrator.

13. The circuit of claim 11 wherein the switched-capacitor integrator includes at least two integrator capacitances.

14. The circuit of claim 13, wherein the two integrator capacitances are used for storing a previous signal and computing a reflected voltage wave.

15. The circuit of claim 1, wherein the switched-capacitor network comprises a filter arrangement.

16. The circuit of claim 15, wherein the filter arrangement comprises an n-path lag wave filter that is formed by the at least one of the switched-capacitor amplifier and the at least one switched-capacitor integrator.

17. The circuit of claim 15 wherein the coefficients of the filter arrangement are digitally programmable by means of at least one switch.

18. The circuit of one of claim 1 further comprising a further switched-capacitor network whereby the demodulated signal of positive and negative values of a carrier frequency can be added.

19. A method of demodulating a modulated measuring signal of a sensor comprising the steps of applying the signal to an input of a switched-capacitor network and operating the network so as to demodulate the signal, and adding positive and negative values of a carrier frequency of the demodulated signal by means of a further switched-capacitor network.

20. The method of claim 19, wherein the signal is filtered by means of a filter arrangement.

21. The method of claim 19, wherein the signal is converted to a square-wave signal.

22. The method of claim 19, wherein the signal is sampled at least once.

* * * * *